United States Patent [19]

Gaebele et al.

[11] 3,737,571

[45] June 5, 1973

[54] AUTOMATIC DARK CURRENT CONTROL

[75] Inventors: Rolf Gaebele, Redwood City; Armand Gambera, Cupertino, both of Calif.

[73] Assignee: GTE Sylvania Incorporated, Mountain View, Calif.

[22] Filed: May 12, 1971

[21] Appl. No.: 142,482

[52] U.S. Cl. ............................178/7.2, 178/DIG. 26

[51] Int. Cl. ............................................H04n 5/16

[58] Field of Search ..................178/7.1, 7.2, DIG. 26

[56] References Cited

UNITED STATES PATENTS

| | | | |
|---|---|---|---|
| 3,089,978 | 5/1963 | Bendell et al. | 178/DIG. 26 |
| 3,126,447 | 3/1964 | Bendell | 178/DIG. 26 |
| 3,339,018 | 8/1967 | Brown | 178/DIG. 26 |
| 3,584,146 | 6/1971 | Cath et al. | 178/DIG. 26 |

FOREIGN PATENTS OR APPLICATIONS

| | | | |
|---|---|---|---|
| 776,764 | 6/1957 | Great Britain | 178/DIG. 26 |
| 1,045,854 | 10/1966 | Great Britain | 178/DIG. 26 |

OTHER PUBLICATIONS

Morgan, RCA Tech. Note No. 257, June, 1959.

*Primary Examiner*—Robert L. Richardson
*Attorney*—Norman J. O'Malley, John F. Lawler and Elmer J. Nealon

[57] ABSTRACT

An automatic dark current control for a television (TV) camera or the like comprises the combination of a dark current level sample-hold circuit and a unique low level clipper in parallel with the video output line from the camera vidicon. An electronic switch in the sample-hold circuit is closed once during each field for the duration of one horizontal line sweep of the vidicon electron beam behind the mask on the photosensitive vidicon surface to charge a capacitor to a level corresponding to the dark current present during that line interval. A signal proportional to the charge on the capacitor is applied to a dark current level adjusting circuit which measures the difference in actual dark current over a predetermined value during the one field. The difference or control signal is applied to a clipper circuit comprising a high gain differential amplifier and a diode switch connected across the input and output of the differential amplifier as well as the video output line. The clipper operates effectively on millivolt differences between control and video signals to automatically limit the dark current in the output signal to the preset level.

2 Claims, 3 Drawing Figures

AUTOMATIC DARK CURRENT CONTROL

BACKGROUND OF THE INVENTION

This invention relates to an improved dark current control circuit for television cameras and the like.

Dark current is that direct current which flows in photoemissive and photoconductive systems in total darkness. The dark current in a vidicon camera or tube is a function of temperature and target voltage and may vary as much as 100 times or more with changes in these parameters. The effect of such increases in dark current level in a vidicon is to lighten the image to such an extent that the picture is washed out. While variations in dark current in manually operated systems may be compensated by a manual adjustment, for example, as described in U.S. Pat. No. 3,564,301, provision must be made in automatically operated vidicon cameras for automatic compensation of excessive dark current. An example of the latter type of camera is one mounted on a pole for surveillance and remote monitoring.

SUMMARY OF THE INVENTION

An object of the invention is the provision of a circuit for automatically compensating for excessive dark current in photoconductive systems such as in a television camera.

Another object is the provision of a variable low level (millivolt) clipper circuit utilizing a conventional diode switch.

The invention comprises means for measuring dark current level once during each field of a TV camera and comparing that level with a predetermined reference to determine the magnitude, if any, of excessive dark current as a control signal. This control signal together with the video signal is applied to a low level (millivolt) clipper circuit which automatically limits the dark current level in the video signal to the predetermined level.

DESCRIPTION OF PREFERRED EMBODIMENT

Figure 1:
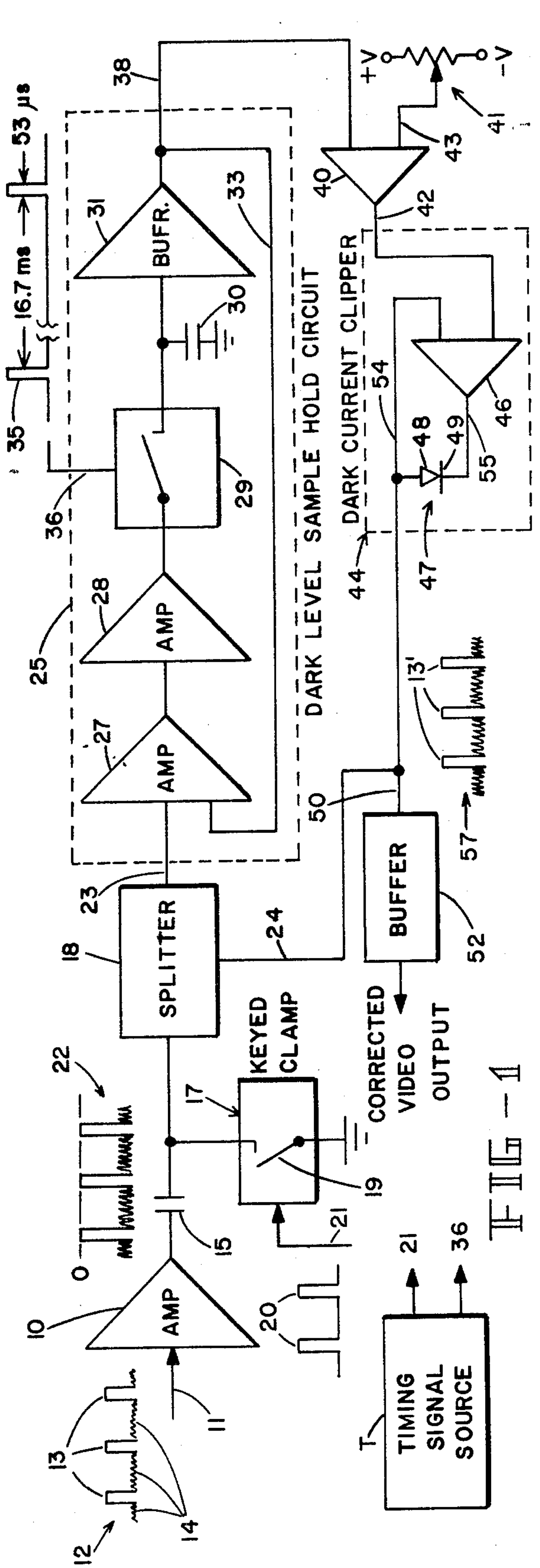
FIG. 1 is a block diagram of an automatic dark current control circuit embodying this invention.

Referring now to the drawings, a circuit embodying the invention is shown in FIG. 1 and comprises an amplifier 10 having an input line 11 connected to the video output of a television vidicon, not shown. The waveform of the video output is of the general type shown at 12 and comprises horizontal blanking pulse 13 and a video signal 14 which contains a dark current component explained in more detail below. The output of amplifier 10 is coupled by capacitor 15 to a keyed clamp circuit 17 and to a signal splitter 18. Circuit 17 operates as a grounded switch, schematically represented at 19, which closes by a composite synchronizing (sync) pulse 20 on input line 21 derived from the timing signal source T of the camera. Each sync pulse 20 is coincident with a blanking pulse 13 and closes switch 19 to essentially clamp the input signal to ground and provide a reference for the operation of the circuit as suggested by the amplified waveform 22 in FIG. 1.

Signal splitter 18, which may comprise an emitter follower, divides the clamped input signal between lines 23 and 24. Line 23 is connected to a dark level sample-hold circuit enclosed within broken line rectangle 25 and comprising series connected amplifiers 27 and 28, sample switch 29, capacitor 30, and buffer amplifier 31. Capacitor 30 is connected in parallel with the output of switch 29, is charged when the switch is closed and retains that charge when the switch is open. Buffer amplifier 31 constitutes the final stage of the circuit. Negative feedback line 33 connected between the output side of buffer amplifier 32 and the input to amplifier 27 insures that the output of the circuit tracks the input so the charge on capacitor 30 is a true measure of dark current.

Normally open switch 29 is closed by control pulses 35 applied to the switch by line 36. Control pulses 35 fall within a period of vidicon scanning beam unblanking during the end of the regular blanking interval. In the final video signal, however, which is transmitted to the display monitor, the regular standard vertical blanking pulse is reinserted. The control pulses 35 are derived from the timing signal generator or source T in the television camera and have a predetermined width and spacing so as to close the sampling switch only while the vidicon electron beam scans one horizontal line behind the mask covering the periphery of the photosensitive surface on the vidicon. Preferably the pulses 35 are timed to occur during sweeping of one horizontal line spaced five to 10 lines from the upper edge of the mask. Typically, such pulses have widths of 53 microseconds and interpulse spacings of 16.7 ms. When switch 29 closes, capacitor 30 charges to a value or level proportional to the dark current in the video signal during the one line sweep. The switch then opens for the remainder of the vidicon field while the charge on capacitor 30 is applied as an output on line 38. Switch 29 typically is a diode.

The signal on line 38 is proportional to the actual dark current level in the video signal for each field. In order to determine a correct or desired dark current level, line 38 is connected as one input to a comparator 40 which also has a second input line 43 connected to an adjustable voltage reference source 41, such as a potentiometer; the setting on the potentiometer represents the desired or selected dark current level. The output of comparator 40 on line 42 is proportional to the difference between the actual dark current level on line 38 and the selected reference voltage of source 41 and thus is a measure of the excess dark current termed "control signal".

It should be noted that the video signal available to be processed typically has a magnitude in the order of millivolts due to the magnitude of signals derived from the photoconductive surface of the vidicon. In order to control or limit the amount of dark current in such relatively small video signals, a variable low level clipper circuit 44 shown in broken lines in FIG. 1 is provided circuit 44 responds both to error signals on output line 42 of comparator amplifier 40 and to actual video signals on output line 24 of splitter 18 to accurately clip the latter.

Clipper circuit 44 comprises a high gain differential amplifier 46 and a diode 47 having an anode 48 and a cathode 49. The output of the clipper circuit is taken on line 50 from the diode anode 48 which is also connected to output line 24 of power splitter 18. Clipper circuit 44 is isolated from the associated video processing circuits by buffer amplifier 52. Anode 48 of diode 47 is also electrically connected by line 54 to the input of amplifier 46. Diode cathode 49 is connected to the output of amplifier 46 by line 55. This clipper circuit, explained in greater detail below in connection with FIG. 3, effectively clips the blanking pulses 13' in the video signal 57 as determined by the setting on potentiometer 41 and thus removes excess dark current. With this circuit arrangement, diode 47, which may be a conventional component having a switching threshold in the order of 0.7 volts, is converted to an ideal diode with a substantially instantaneous switching action capable of effectively clipping video signals in response to a millivolt difference between video and control signals. The feedback connection 54 between diode 47 and the amplifier 46 insures that there is no distortion of the output waveform 57 which is identical to input waveform 12 except for the clipped portion of the blanking pulses.

Figure 2:
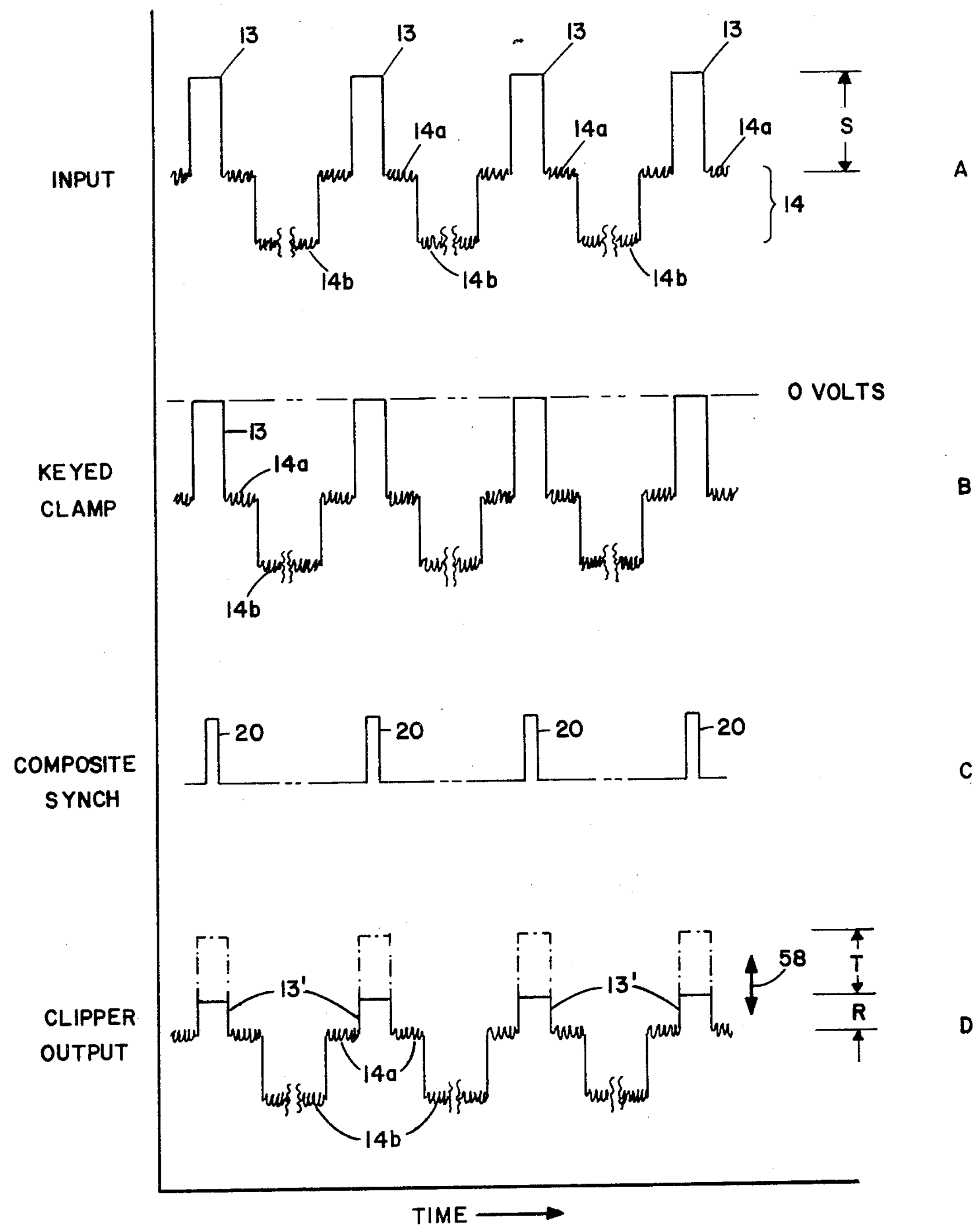
FIG. 2 illustrates a set of voltage waveforms which illustrate the operation of the invention.

The operation of the circuit shown in FIG. 1 will be more clearly understood by reference to the enlarged waveforms shown in FIG. 2. The waveform of the input signal to amplifier 10 is shown in FIG. 2A and comprises blanking pulses 13 and video signals 14 having a dark current component 14*a* and a video component 14*b*. The level of the dark current in this composite signal is indicated by distance S between the top of the blanking signal and dark current component 14*a*. It should be understood that the waveform representation in FIG. 2A as well as in FIGS. 2B and 2D are not precise representations of the video signal and blanking pulse but are merely illustrative for the purposes of explaining the circuit operation. Thus variations in the dark current level S likely to occur over several fields are not indicated in these waveforms.

The operation of the keyed clamp circuit 17 produces the waveform of FIG. 2B which is substantially identical to FIG. 2A except for the provision of a ground or zero volts reference to which the signal is clamped. FIG. 2C shows the composite synchronization signals 20 which cause the keyed clamp switch 19 to close during the interval of the blanking pulses 13. FIG. 2D shows the operation of the clipper circuit 44 which removes or "clips" the portion T of the blanking pulses to reduce the dark current level to the distance indicated by R. Variation of the height R of the blanking pulse as indicated by the double-headed arrow 58 is achieved by adjustment of potentiometer 41.

Figure 3:
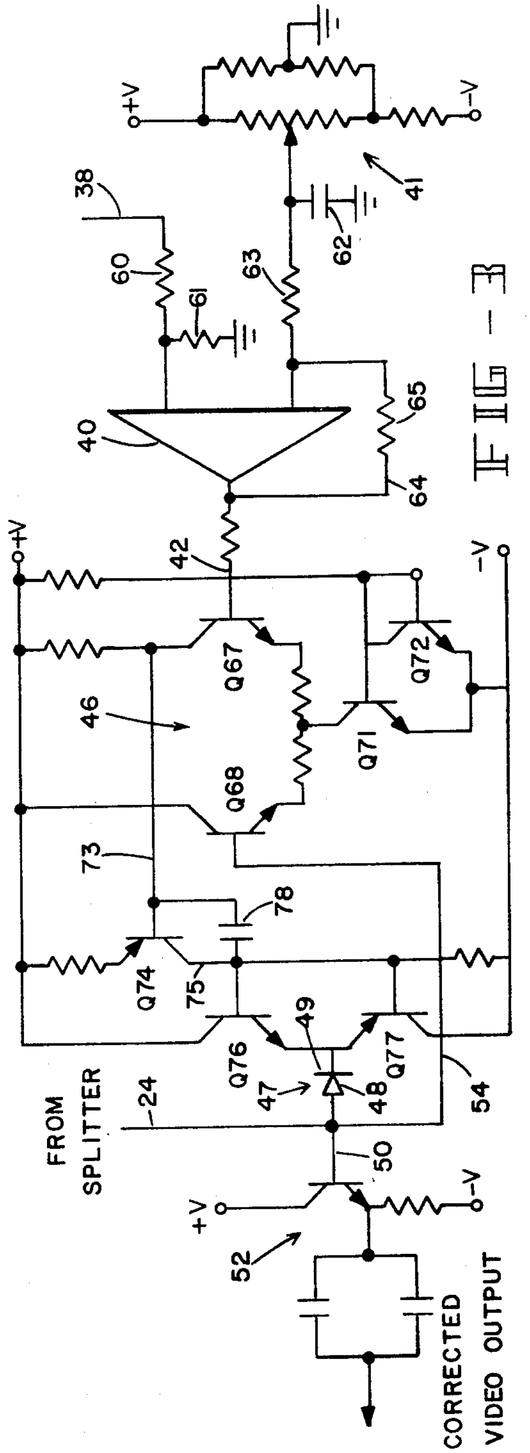
FIG. 3 is a diagram of a dark current level adjust and clipper circuits.

A detailed diagram of dark current clipper circuit 44 is shown in FIG. 3. The signal on line 38 is applied as one input to comparator 40 across resistors 60 and 61 while the output of potentiometer 41 is applied across bypass capacitor 62 and resistor 63 as the other input. A feedback line 64 including resistor 65 is connected between the comparator output and the input from potentiometer 41; the values of resistors 60, 61, 63 and 65 are equal, thereby making comparator 40 a unity gain amplifier.

The output of comparator 40 is resistively coupled by line 42 to high gain differential or balanced amplifier 46 comprising transistors Q67 and Q68 having emitters respectively resistively connected to a constant current source transistor Q71 which is biased by transistor Q72. Transistor Q71 supplies a constant current for transistors Q67 and Q68 to insure that they operate in a balanced mode and transistor Q72 merely biases the latter to achieve this result. Line 42 is connected to the base of transistor Q67 as one input to the balanced amplifier and line 54 from video output line 50 is connected to the base of transistor Q68 as the other input. The collector of transistor Q67 is connected by line 73 to the base of a switch transistor Q74, the collector of which is connected by line 75 through transistors Q76 and Q77 to the cathode of diode 47. Transistors Q76 and Q77 are emitter followers which provide a low output impedance that aids in turning diode 47 on and off at high switching rates. The base and collector of switching transistor Q74 are interconnected by capacitor 78 to prevent oscillations in the circuit when the diode conducts.

In operation, comparator 40 compares the setting on potentiometer 41 with the input on line 38 from the sample-hold circuit, the latter representing a true value of dark current measured at the beginning of each scanned field. The output of comparator 40 on line 42 then represents a value, called a control signal, which is the difference between these two inputs, and this control signal is applied as one input to the differential balance amplifier 46 via line 42 to the base of transistor Q67. The other input to amplifier 46 is the clamped video signal from power splitter 18 via lines 24 and 54 to the base of transistor Q68. Potentiometer 41 is set to a desired clipping level 58 (FIG. 2D) less than the clamped reference voltage (0 volts as shown) and this produces a control voltage input to transistor Q67 that is less than the dark current level S (FIG. 2A) applied as the input to transistor Q68.

When a blanking pulse 13 applied to transistor Q68 on line 54 exceeds the control voltage on line 42, transistor Q67 conducts less current thereby increasing the voltage on its collector electrode and on the base of switch transistor Q74. This causes transistor Q74 to instantly cease conducting thereby raising the voltage on the bases of transistors Q76 and Q77 to −V and forward-biasing diode 47 into a conduction state. When diode 47 conducts, it clips the blanking pulse. In other words, when the video signal begins to exceed the control voltage, diode 47 is turned on hard to quickly cut off peaks in the blanking pulse. Transistor Q68 is essentially converted into a unity gain amplifier when the diode conducts so that only the blanking pulse is clipped at the preset level and the video signal 14 (FIG. 2A) on line 50 remains unaffected.

When the blanking pulse no longer exists on line 24, the control voltage input to transistor Q67 exceeds the input to transistor Q68, the former conducts more heavily, decreasing the voltage on its collector electrode and thus on the base of switch transistor Q74. This causes the switch transistor to be turned on (conducts) to produce a more positive voltage which is applied through transistors Q76 and Q77 to the cathode of diode 47 to reverse bias and shut it off. Thus the circuit does not clip.

Buffer amplifier 52 isolates the clipper circuit from the associated video processing circuits and delivers a video output signal with a substantially constant level of dark current irrespective of the variations of the absolute level of dark current in the original video signal.

We claim:

1. In a television camera having a vidicon with a photosensitive surface and a mask on said surface having an opening defining the imaging area of the surface, said vidicon having a scanning electron beam progressively and repeatedly traversing said surface to define successive fields and producing an input video signal comprising horizontal blanking pulses and video information with a dark current component, an automatic dark current control circuit for producing a corrected output video signal comprising means for clamping said input video signal to a reference level, a signal splitter having an input connected to the output of said clamping means and having two output lines, means for automatically sampling said clamped video signal during traverse of said beam across a portion of said photosensitive surface behind said mask, one of said output lines being connected to the input of said sampling means, means for storing a signal proportional to the magnitude of the actual dark current in the sampled video signal, a source of a reference signal, means for comparing said stored signal with said reference signal and producing a control signal proportional to the difference, and means responsive to said control signal and to said clamped video signal for clipping said blanking pulses whereby to reduce the magnitude of the dark current component in said output video signal, said clipping means comprising a differential amplifier and a diode, said amplifier having two inputs and an output, said amplifier inputs being connected to the other output of said splitter and the output of said comparing means, respectively, said diode being connected across said other output of the splitter and said output of said amplifier.

2. The circuit according to claim 1 in which said diode has two electrodes, switch means connected between said output of said amplifier and one of said diode electrodes for changing the bias voltage on said diode in response to said control signal, the other of said diode electrodes being connected to said other output of the splitter, and a feedback line connecting said other of the diode electrodes to said input of the amplifier whereby to cause rapid change of the diode between states of conduction and nonconduction.

* * * * *